Oct. 25, 1938. W. P. GEE 2,134,331
SEPARATION OF WAX FROM MINERAL OIL BY FILTRATION
Filed March 31, 1934 4 Sheets-Sheet 2

William P. Gee
INVENTOR
BY R. J. Dearborn
his ATTORNEY

Oct. 25, 1938.  W. P. GEE  2,134,331
SEPARATION OF WAX FROM MINERAL OIL BY FILTRATION
Filed March 31, 1934  4 Sheets-Sheet 3

William P. Gee
INVENTOR

BY R. J. Dearborn
his ATTORNEY

Oct. 25, 1938.   W. P. GEE   2,134,331
SEPARATION OF WAX FROM MINERAL OIL BY FILTRATION
Filed March 31, 1934   4 Sheets-Sheet 4

INVENTOR
William P. Gee
BY R. J. Dearborn
his ATTORNEY

Patented Oct. 25, 1938

2,134,331

UNITED STATES PATENT OFFICE 2,134,331

SEPARATION OF WAX FROM MINERAL OIL BY FILTRATION

William P. Gee, Plainfield, N. J., assignor to The Texas Company, New York, N. Y., a corporation of Delaware Application March 31, 1934, Serial No. 718,347

4 Claims. (Cl. 196—19)

This invention relates to an improved process of dewaxing mineral oil by filtration, and to an improved process of continuous filtration applicable thereto; and the present application is a continuation-in-part of my application Serial No. 607,270, filed April 25, 1932.

The invention contemplates a process of filtering solid hydrocarbons or paraffin wax from liquid hydrocarbons comprising consecutively submerging a hollow filtering surface within a cold mixture of solid and liquid hydrocarbons during which solid hydrocarbons are deposited on the surface to form a filter cake while the liquid flows through the surface into its interior, then moving the surface out of the mixture through a zone of cake washing, drying and discharge while maintaining the filter cake and filtering surface at a temperature below that at which the solid hydrocarbons tend to soften or liquefy. During passage of the filter surface through this zone, chilled gas is forced through the cake and the filter surface to maintain the cake and surface in a cold condition thus preventing softening or re-solution of the wax in the liquid contained in the cake, or applied thereto as a wash, with consequent penetration and plugging of the filter fabric by the dissolved waxy material.

My invention may be employed in connection with either continuous or intermittent filters. One form of filter may, for example, comprise a hollow rotating cylinder or hollow rotating leaves with means for creating vacuum within the interior of the filter element or for exerting positive pressure upon the exterior thereof.

In operation, the rotating cylinder is kept partially submerged in the filtering mixture. Solids are deposited on the submerged portion of the surface to form a cake while liquid flows through the surface into the interior of the cylinder from which it is withdrawn as filtrate. As the cylinder rotates the cake is exposed whereupon it may be dried and washed by applying solvent liquid to the surface of the cake, the liquid being drawn through the cake into the interior of the cylinder for removal. The cake may be subjected to further drying to remove remaining wash liquid following which the cake is removed, usually by applying a slight reverse pressure to the interior of the filtering element causing distention of the fabric and consequent loosening of the cake, complete removal of which is facilitated by suitable means located adjacent to the exterior surface of the filter fabric.

Experiments have indicated that when attempting to filter precipitated wax from cold wax-bearing oil, or mixtures of such oil and solvent, with a continuous or intermittent type of filter where change of temperature is involved, the initial filtering rate may be fairly high but it almost immediately decreases and drops off exceedingly rapidly. This is due to plugging up of the pores or interstices of the filter fabric with waxy material which has become liquid and penetrated the fabric during the time the cake and filter surface is exposed in the relatively warmer zone above the cold filtering mixture.

During this time the filter cake and the filter cloth or fabric become substantially warmer due to contact with the surrounding atmosphere, particularly during the cake drying operation where air or gas is drawn through the cake and the cloth from the relatively warmer surroundings. Contact with the warmer gas and exposure to the warm surroundings causes the wax to soften and redissolve in the oil adhering to or absorbed in the cake, or in the wash liquid, and this solution penetrates the fabric or filtering medium along with the gas or air which is being drawn therethrough. Upon submergence of the fabric in the cold mixture in the bowl of the filter, solidification of this wax occurs within the interstices of the fabric and also within the fibres of the fabric itself. Consequently, the filtering surface soon becomes substantially completely plugged and filtration is rendered practically impossible.

I have found that by completely enclosing and surrounding the exposed filtering surface, and circulating chilled gas through the surface during the time it is out of contact with the cold filtering mixture so as to maintain the temperature of the cake as well as that of the fabric at substantially that of the cold mixture, or nearly so, I am able to prevent the aforementioned plugging effect. By this means, I am able to maintain a continual high economic rate of filtration.

In order to better understand the invention, reference will now be made to the accompanying drawings which disclose preferred embodiments of the invention, and in which Fig. 1 is a diagrammatic view of apparatus for carrying out the method of the present invention;

Fig. 3 is a diagrammatic view of still another modified form of apparatus for carrying out the method of the present invention in a plant in which filter aid is not employed;

Fig. 6 is a perspective view of a portion of the filtering surface;

Fig. 7 is a partial sectional view taken on the plane of the line 7—7 of Fig. 6; and Fig. 8 is a partial sectional view taken on the plane of the line 8—8 of Fig. 6.

Figure 1:
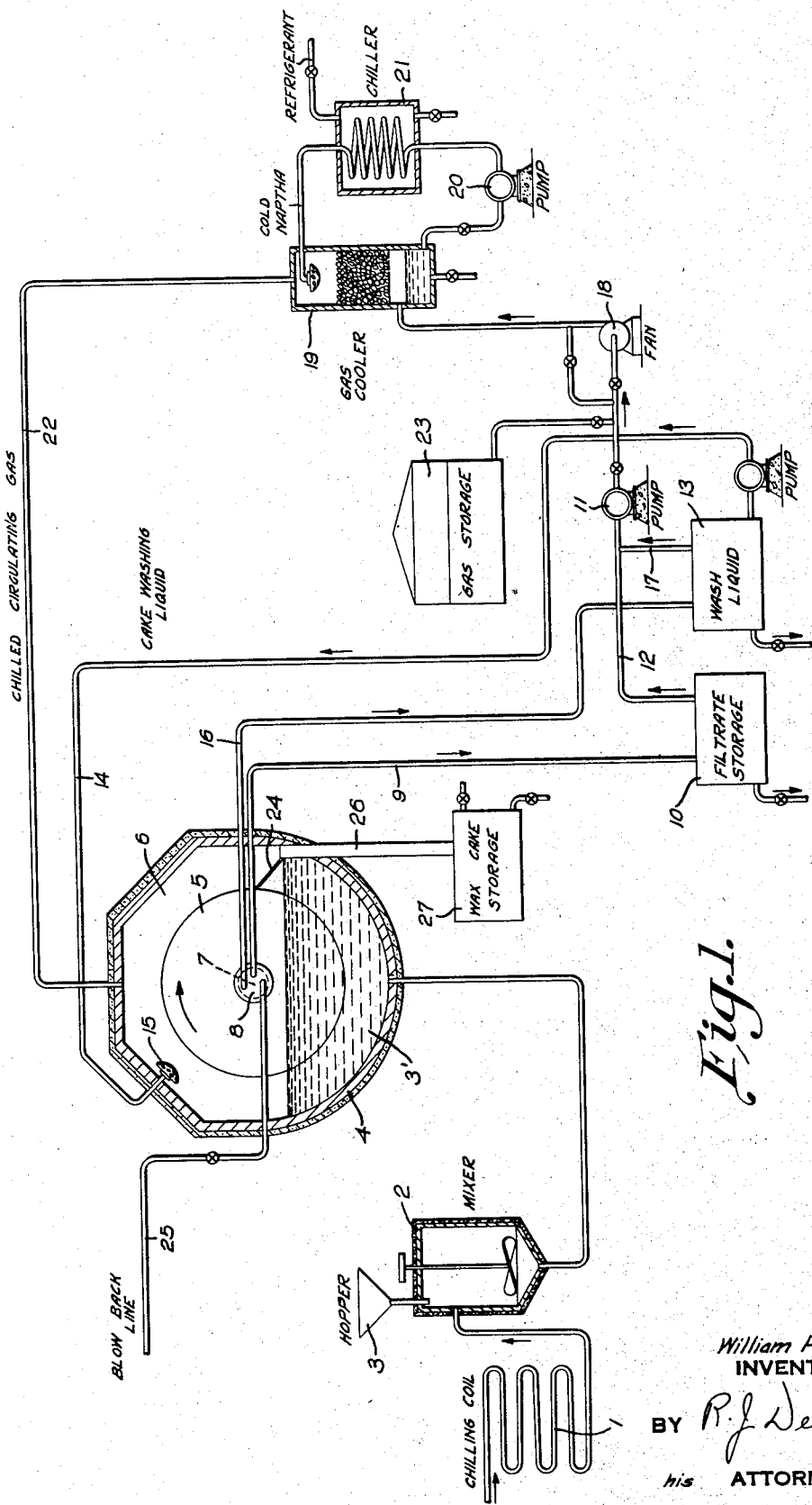

Referring to Fig. 1, the wax-bearing mineral oil, such as cylinder stock, is advantageously mixed with a solvent liquid or wax-precipitating medium. This solvent liquid may comprise a light petroleum fraction, such as naphtha or various other organic solvent liquids or mixtures thereof, including alcohols, ketones, aldehydes, cyclic hydrocarbons, benzol or its homologues, or derivatives of these various materials.

The mixture of oil and solvent liquid is delivered from a source not shown in the diagram and conducted through a chilling coil 1 wherein it may be cooled to a temperature of around 0° F. or below. The chilled mixture is then introduced to a mixer 2 wherein it is admixed if desired, with a comminuted solid filter aid material introduced to the mixer from a hopper 3. The mixer is preferably provided with a jacket into which a refrigerant may be introduced, or through which it may be circulated in order to maintain the mixture in a chilled condition.

This chilled mixture of oil, precipitated wax and filter aid material is then conducted to the bowl 3' of a filter 4. This filter is advantageously of the continuous rotating drum type, somewhat similar in general principles to that employed heretofore in industrial filtration. The exterior of the filter shell is covered with heat-insulating material to facilitate maintaining the interior in a cool condition.

During rotation of the hollow drum 5, the cylindrical surface thereof, comprising a filtering surface or medium formed from cloth or metal fabric or any porous filtering material, passes through the body of filtering mixture maintained in the bowl 3' of the filter, and then emerges therefrom during passage through the upper and hooded portion 6 of the filter.

The precipitated wax and admixed filter aid material is deposited upon the exterior and submerged portion of the surface to form a filter cake, while the solvent and dissolved oil are forced through the filter surface into the interior of the drum. The liquid within the interior of the drum is withdrawn therefrom through the hollow rotating shaft 7, the filter valve 8, the pipe 9 in communication therewith, and into a filtrate storage tank 10. The tank 10 is maintained under a reduced pressure by means of vacuum exerted through a vacuum pump 11 communicating with the top of the tank through a pipe 12.

When that portion of filter surface over which filter cake is deposited emerges from the cold filtering mixture into the hooded portion of the filter, the application of vacuum upon the interior of that portion of the surface is continued for the purpose of removing mother liquor contained in the cake. Upon further rotation, washing liquid, such as naphtha, for example, from a tank 13 is applied to the surface of the filter cake through a pipe 14 and a nozzle 15 positioned within the hood 6 adjacent to the filter cake. This spray liquid is drawn through the cake into the interior of the drum and is separately withdrawn therefrom through the hollow shaft 7, filter valve 8 and pipe 16 into the storage tank 13. The vacuum pump 11 also communicates with the tank 13 by means of a pipe 17 for the purpose of creating a vacuum in the tank and also within the interior of the filter drum. This vacuum is continued after the filter cake has advanced beyond the nozzle 15 to permit drying the cake and maintaining it in a cold condition by drawing cold gas therethrough as will now be explained in more detail.

While the vacuum pump 11 is shown as taking direct suction on the tanks 10 and 13, it may be advantageous to interpose a foam trap between these tanks and the vacuum pump to remove entrained matter from the gas. Such a trap is preferably mounted about 35 or 40 feet above the tank and provided with a water leg through which liquid matter removed in the trap may be drawn off.

The exhaust gases from the vacuum pump 11 are advantageously conducted directly to a gas cooler 19. If desired, a fan or blower 18 may be used to reduce the back pressure on the vacuum pump.

The cooler 19 comprises a column packed with Raschig rings or other suitable packing means. Cooling liquid, preferably the solvent being used such as cold naphtha, at a temperature, for example, of about —40° F., is sprayed over the packing by which means it is brought into intimate contact with the gas passing upwards therethrough. The naphtha collecting in the bottom of the column, and at a temperature of about +40° F., is withdrawn by a pump 20 and passed through a chiller 21 wherein it is again chilled by interchanging heat with a refrigerant. Liquid ammonia may be expanded into the shell of the chiller to effect the necessary refrigeration.

The temperature to which the naphtha is chilled depends on the extent to which it is desired to cool the gas, and this in turn depends upon the character of the solid material being filtered. Usually it is desirable to keep the cake at substantially the same temperature as the filtering mixture. By maintaining the bottom of the column at a temperature above +32° F. any water removed from the gas may be withdrawn from the bottom of the column. It is desirable to keep the circulating gas free from water which might penetrate the cake and the fabric and deter filtration.

The chilled gas at a temperature, for example, of about —30° F., is then conducted through a pipe 22 to the hood 6 of the filter wherein it surrounds the filtering surface during its emergence from the filtering solution. This chilled gas is forced through the filter fabric prior to and subsequent to the removal of the filter cake therefrom. In this way, the cake and the filter surface are continually maintained at a temperature substantially nearly the same as that of the cold mixture undergoing filtration; for example, in this case at a temperature of from about 0° F. to —10° F.

To take care of gas losses, fresh gas may be drawn from the storage tank or gasometer 23 by the fan 18. The gas referred to herein may include air, flue gas, hydrocarbon vapor, fixed gases such as nitrogen and so forth. I have found it of advantage to use flue gas which is relatively inexpensive.

The cake is discharged from the filter surface after washing and drying by introducing, for a short period of time, a positive gas pressure to the interior of the particular segment of the filter drum in question, causing the filter fabric to bulge and loosen the cake which is then removed therefrom by scrapers 24. This reverse gas pressure may be effected by introducing chilled gas through the filter valve 8 from a line 25 leading from a suitable source of supply, as for example, the cooler 19.

The dislodged cake removed from the filter surface falls through the chutes 26 into a closed storage tank 27 from which it may be withdrawn for further treatment including the removal therefrom of retained oil and solvent as well as for the separation and recovery of the filter aid material.

While a vacuum type of continuous filter has been described, it is contemplated that the invention is equally well adapted to pressure filtration wherein superatmospheric pressures may be maintained on the exterior of the filtering surface.

Figure 2:
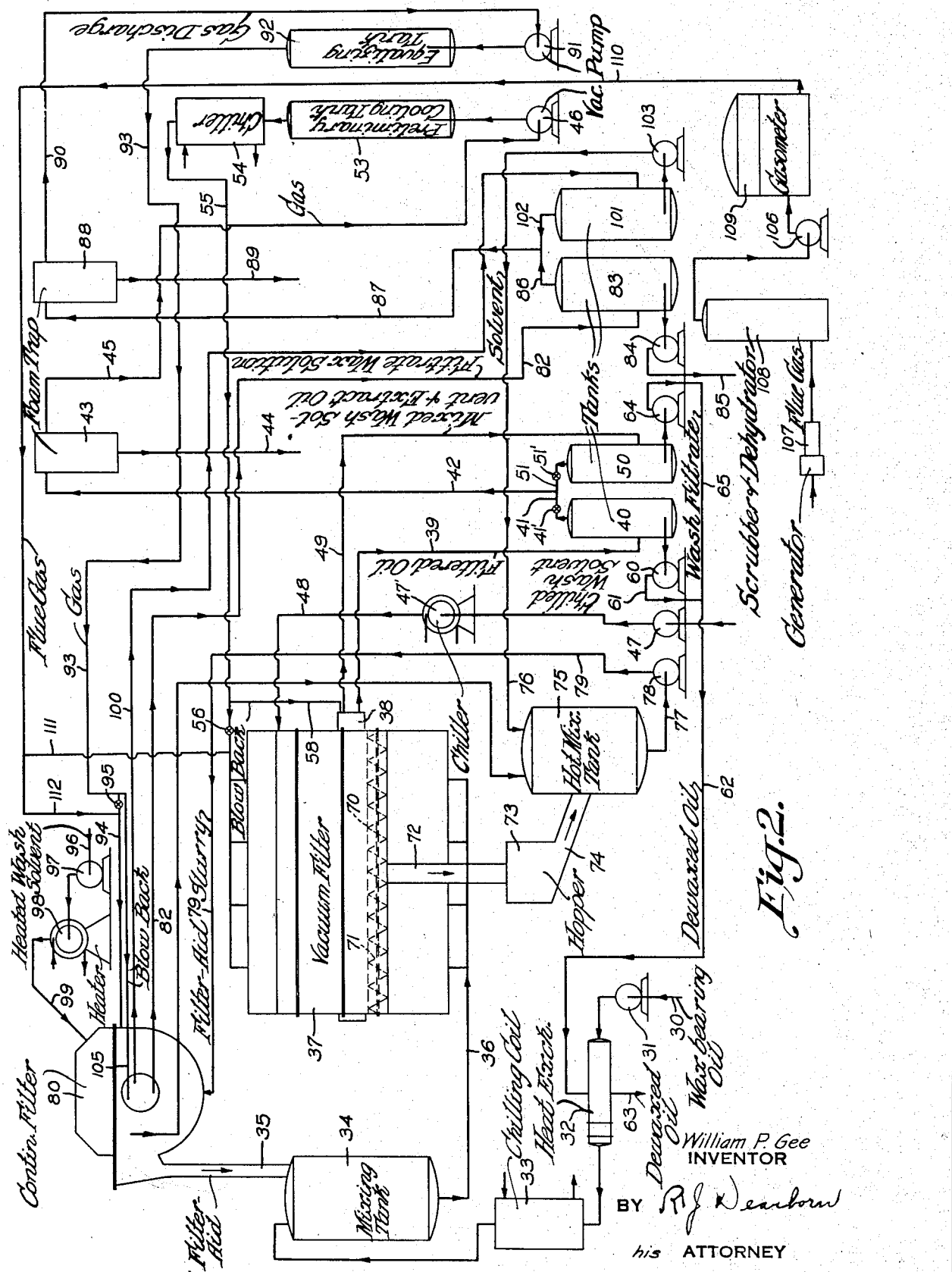
Fig. 2 is a diagrammatic view of a modified arrangement, illustrating the invention as applied to a filter aid dewaxing process with recovery of filter aid.

Referring to Fig. 2, there is disclosed a plant for filter aid dewaxing by continuous filtration with continuous recovery of filter aid, in which a foam trap is mounted between the filtrate and the wash solvent tanks and the vacuum pump in the manner described above. Wax-bearing oil is supplied from line 30 by pump 31 through heat exchanger 32 and chilling coils 33 to a mixing tank 34, where it is mixed with recovered filter aid supplied through chute 35. The mixture then passes by line 36 to an enclosed rotary vacuum filter 37 of the type described above, and which operates with a continuous filtering cycle including pick-up or cake forming, washing, drying and cake discharge. In the cake forming stage, filtered oil is discharged from the valve 38 of the filter through line 39 to tank 40. The latter is connected by line 41 to a common suction line 42 leading to a foam trap 43 having a gravity leg 44 through which any trapped or entrained liquid is discharged into a barometric seal or drum, the separated gas passing by line 45 to the suction side of vacuum pump 46. Chilled wash solvent, supplied by pump 47 through chiller 47' and line 48 to the distributing means of the filter 37 at the washing stage of the filtering cycle, passes through the filter cake; and the mixed wash solvent and extracted oil discharges through line 49 to solvent storage tank 50. The latter is connected by pipe 51 to the common suction line 42 leading to the foam trap 43 and thence to suction pump 46 as described above.

The separated gas is supplied by pump 46 under pressure through a preliminary cooling tank 53 and a chiller 54 to line 55, and then through pressure reducing valve 56 to the interior of the filter casing, to continuously maintain the chilled gaseous atmosphere surrounding the filtering surface. Chilled gas at a suitable pressure, such as about 2 to 5 pounds gauge, may be passed through branch 58 to the proper passage in the valve 38 of the filter, to assist in the discharge of the cake in the blow-back portion of the cycle. Dewaxed oil is withdrawn from tank 40 by pump 60 and supplied through lines 61 and 62 to the heat exchanger 32, where it serves to partially cool the incoming oil to be dewaxed; and then passes by line 63 to a suitable point of storage for distillation for solvent recovery. The wash filtrate discharge may be in common with the oil filtrate discharge, as shown, where the wash filtrate is passed from tank 50 by pump 64 through lines 65 and 62 to discharge 63 for solvent recovery. Lines 41 and 51 are provided with valves 41' and 51' respectively, so that the vacuum produced by pump 46 in the tanks 40 and 50 may be independently controlled. In some gases, it is found desirable to maintain a higher vacuum or pressure differential on the filtering surface during the washing stage than during the pick-up or cake forming stage. For example, improved results have been secured by maintaining a vacuum or pressure differential of about 15 inches of mercury on the filtering surface during the time that the filtering surface is immersed in the chilled wax-bearing mixture and when the cake is being built up on the filtering surface, and a vacuum or pressure differential of about 25 inches of mercury on the filtering surface throughout the washing and drying portion of the cycle. This is conveniently effected by adjustment of the valves 41' and 51' which control the application of suction to the mentioned stages of the filtering cycle through the lines 39 and 49 respectively.

The mixed wax and filter aid continuously removed by blow-back 58, assisted if desired by a suitable scraper of deflector blade, falls into a discharge trough 70 containing a scroll 71, which feeds the material to a discharge 72 terminating in a hopper 73, which in turn feeds through chute 74 into a hot mix tank 75. A solvent, such as naphtha, is supplied to the tank by line 76. The tank is equipped with a suitable agitator and a steam coil or jet (not shown), whereby the contents are mixed and heated to dissolve the wax in the solvent and to form a pumpable slurry of the filter aid suspended in the wax solution. The slurry is withdrawn through line 77 by pump 78 and passed by line 79 to a continuous enclosed filter 80, which may be of similar construction to the filter 37, operating with stages of pick-up, washing, drying and cake discharge. In the pick-up or cake forming stage of the cycle, the filtrate of wax solution is discharged through the line 82 into tank 83, from which the wax solution may be withdrawn by pump 84 and passed through line 85 for recovery of the solvent from the contained wax. The upper portion of tank 83 communicates by lines 86 and 87 with a foam trap 88 having a gravity discharge leg 89 for any entrained liquid, and a gas discharge 90 communicating with the suction side of a vacuum pump 91 which discharges into an equalizing tank 92. Gas from tank 92 passes through lines 93 and 94, the latter containing pressure reducing valve 95, to the interior of the casing of the filter 80, to complete the gas cycle which minimizes solvent loss. During the washing stage on filter 80, heated wash solvent, such as naphtha, supplied from line 96 by pump 97 through heater 98 and line 99, is directed onto the formed filter cake to remove contained wax solution therefrom. The resulting solution is withdrawn through line 100 to solution tank 101, the vapor space of which is connected by line 102 with the common suction line 87 leading to foam trap 88 and vacuum pump 91. The resulting solution is withdrawn from tank 101 by pump 103 and returned by line 76 to serve as solvent liquid in the hot mix tank 75. Pressure gas from line 93 is supplied by branch line 105 as blowback to remove the washed and dried cake of filter aid material from filter 80. This cake is discharged into chute 35, which returns the filter aid to mixer 34 for reuse in the process.

A pump 106 withdraws flue gas from a generator 107 through a scrubber and dehydrator 108, and forces the gas under a controlled pressure into a gasometer 109, which maintains a balanced pressure on the system. Flue gas is supplied from the gasometer 109 through line 110 to the interior of the filter casing 37 by means of line 111, and to the interior of filter 80 by means of line 112. The gasometer thus floats on the system, supplying a small amount of make-up gas as required to maintain the desired quantity and pressure of gas within the system. The pressure within the gasometer 109 is controlled to the desired pressure which is to be maintained within the filter casings by suitable regulation of pump 106.

It was formerly considered essential to employ filter aid in connection with the dewaxing of certain distillate and residual oils by filtration. It has now been found that the use of filter aid can be dispensed with in certain dewaxing processes employing filtration. This is advantageously accomplished by the employment of certain selective solvents or solvent mixtures, which at lowered temperatures are solvents for the oil, but in which the precipitated wax is substantially completely insoluble; or by the use of solvents of low viscosity which give a crystalline wax on chilling. Examples of such selective solvents include a mixture of acetone and benzol, and a mixture of acetone, benzol and toluol; and propane is an example of the latter type of solvent of low viscosity. Very satisfactory results have been secured where a solvent consisting of substantially 35% by volume of acetone and 65% by volume of benzol is employed in the ratio of from two to four parts of solvent mixture to one part of wax-bearing oil. In the case of residual oils, a very satisfactory solvent mixture consists of about 28–35% acetone, 47–57% benzol and 15–18% toluol in substantially the same proportions of solvent mixture to oil. In such case, it is also found highly desirable to wash with the same selective solvent mixture. By the use of a solvent mixture of this character, the wax is precipitated in a form which admits of satisfactory filtration at commercial rates. By the use of such a selective solvent mixture for washing the formed wax filter cake, re-solution of some of the wax is avoided, and consequently the oil removed in the wash stage has substantially the same pour test as the filtrate, whereby the two may be mixed to give an increased dewaxed oil yield of the desired low pour test. When this is coupled with a gas recirculation system of the character disclosed herein, which maintains the filtering surface at all times at substantially the temperature of the wax-bearing mixture being filtered, successful operation of the filter over substantial periods of time is assured. Thus, by the cooperation of the several features, including the precipitation of the wax in a more suitable form for filtration, the maintenance of the filtering surface in a condition of high effectiveness, and the avoidance of re-solution of the wax cake, separation of wax by continuous filtration may be accomplished without the use of filter aid.

Referring to Fig. 3, there is shown a simplified plant for continuous filtration, in which filter aid is not employed. The chilled wax-bearing oil is supplied through line 120 to feed tank 121 and thence by line 122 controlled by valve 123 to a continuous enclosed filter indicated generally at 124. A drain line 125 controlled by valve 126 is provided for draining the filter tank.

The continuous filter may be of the type previously described, operating with stages of pick-up, washing, drying and cake discharge. In the pick-up or cake forming stage of the cycle, filtrate is discharged from the usual control valve 128 through line 129 to tank 130. Wash filtrate is discharged through line 132 to tank 133. The upper portions of tanks 130 and 133 communicate through lines 136 and 137, respectively provided with valves 138 and 139, with a common suction line 140 leading to a foam trap 141 having a gravity discharge leg 142. Gas is withdrawn from foam trap 141 through line 143 by vacuum pump 144, and supplied under low pressure to preliminary cooler 145 and thence through chiller 146 and line 147 containing pressure reducing valve 148 to the interior of the closed filter casing to maintain the chilled gaseous atmosphere therein.

Where a solvent mixture of the character of acetone-benzol is employed for dewaxing, it is found desirable to use an indirect chiller 146, rather than the direct chiller shown in Fig. 1. For example, the chiller may be of suitable heat exchanger construction, having a bank of tubes through which the gas passes in indirect heat exchange relationship with a refrigerant, such for example as chilled brine, ammonia, $SO_2$ or other suitable refrigerant. A branch line 149 leads from chiller 146 to an auxiliary pump 150, which serves to force chilled gas at a regulated positive pressure, which is independent of fluctuations of pressure in the main circulation system, through the blow-back line 151 for discharge of the cake.

A liquid discharge pump 153 serves to discharge the oil filtrate and the wash filtrate through lines 154 and 155, respectively controlled by valves 156 and 157, to a discharge line 158 leading to solvent recovery. Pump 162 draws flue gas from generator 163 through scrubber and dehydrator 164, and discharges the gas into gasometer 165. From the latter, gas is supplied through line 166 to line 147 beyond valve 148, and thus to the interior of the filter casing, to make up for any gas loss and to maintain the quantity and pressure of gas within the circulating system. Inasmuch as the gas loss is very small, the quantity of gas passing from the gasometer to the filter casing is insufficient to materially affect the temperature of the gaseous atmosphere therein.

Figure 4:
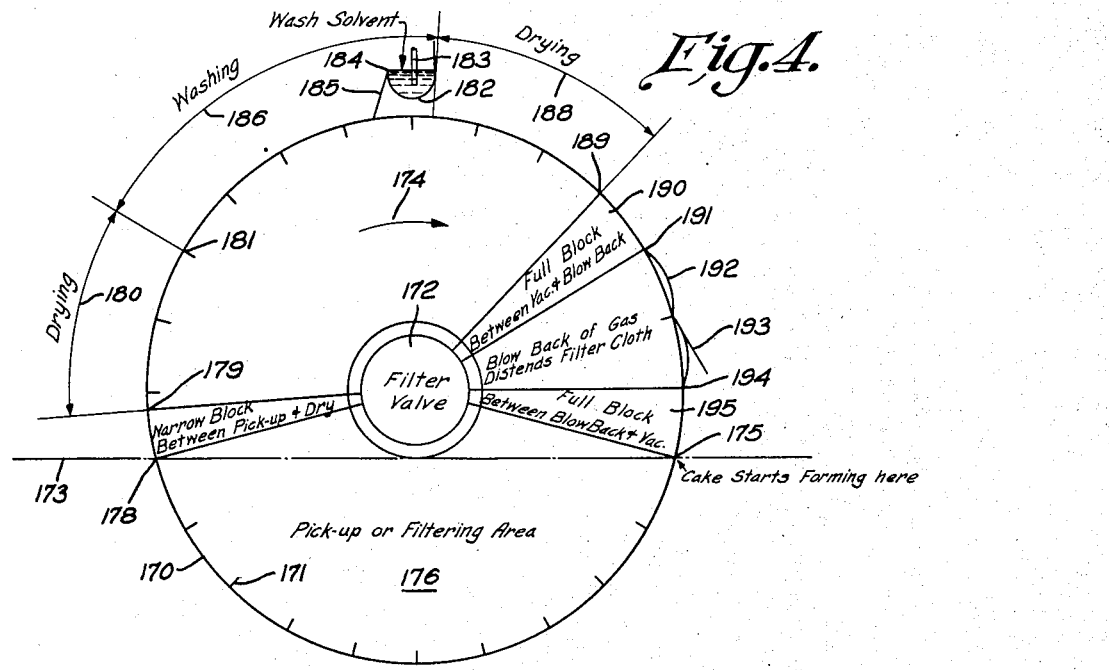
Fig. 4 is a diagrammatic view illustrating the filtering cycle and the method of supplying washing solvent to the filter cake.

Fig. 4 shows diagrammatically and in outline a rotary vacuum continuous filter of the type used in Fig. 1 to 3 for wax filtration, with the filtering cycle indicated thereon. The filtering surface is shown at 170, and is divided by division strips 171 into a plurality of longitudinal segments, indicated as 24 in number about the periphery of the filter, although of course the number may be varied. The customary filter valve which controls the application of suction and the supply of pressure blow-back gas to the interior of the filtering segments at various stages in the cycle of rotation of the filter, is indicated at 172. The liquid level of the chilled wax-bearing mixture within the vat or casing of the filter is shown at 173. The filter rotates in the direction of the arrow 174, and cake formation starts at 175. At this point, the filter valve opens to communicate suction to the filtering surface, which suction continues throughout the extent of the immersed portion of the filter, to provide the pick-up or cake forming area 176. The filtered oil from this section is discharged through the filtrate line as previously described. As the filtering segments consecutively emerge from the chilled mixture, their communication with the filtrate outlet is cut off at 178; and after a short rotation, communication with the washing and drying discharge port of the valve is initiated at 179. The action of the vacuum then creates a pressure differential on the filtering surface, which causes the chilled gaseous atmosphere surrounding the filter to act upon the cake during the drying stage 180, to drain or strip retained oil from the cake. The washing of the drained cake then commences, as indicated at 181.

So far as I am aware, all prior suggestions for washing a wax cake on a filter have been to apply sprays of washing solvent thereto. I have discovered that superior results are obtained by supplying the washing solvent to the cake in the form of a continuous liquid film which flows continuously onto the cake. This is accomplished by the weir feed, comprising the trough 182 which is mounted to extend longitudinally throughout the length of the filter, being supported in any suitable manner from the casing walls. Washing solvent is continuously supplied to the trough by supply pipe 183 so as to maintain a continuous overflow at the weir 184. This forms a sheet or film of liquid throughout the length of the filter, which flows down an inclined guide 185 onto the filter cake in a direction opposite to the direction of rotation of the filter. Sufficient washing liquid is supplied so as to maintain a thin liquid film over the exposed portion of the filtering surface substantially throughout the extent of the washing zone indicated at 186, the film being of course thicker at the upper portion adjacent the weir feed. The outer portion of the film flows downwardly over the filter cake countercurrent to the direction of the rotation of the filter, while the inner portion of the film adjacent the cake assumes movement along with the filter cake. The pressure differential existing upon opposite sides of the cake and liquid film tends to force the wash liquid down into the cake to displace remaining oil therefrom. Preferably, the quantity of wash liquid supplied, and the extent of the washing zone, is controlled to afford substantially complete displacement of retained oil from the cake, while avoiding the use of an excess of solvent which would needlessly drain through the cake after oil has been expelled. This displacement weir wash affords economy in the use of wash solvent, obtains an increased yield of dewaxed oil, and avoids solvent loss which I have found to be inherent in the use of sprays, when volatile solvents are employed.

Following the washing zone, the cake is then subjected to further pressure differential during the drying stage 188, at which time cold gas from the atmosphere surrounding the filter is drawn through the filtering surface to displace wash solvent as well as to maintain the filtering surface chilled to a low temperature. The liquids and gases drawn through the filter during the zone from 179 to 189, at which latter point the discharge passage is closed by the valve, are discharged through the wash solvent line as previously described. A full block 190 separates the termination of the vacuum and the initiation of blow-back at 191. At this point, chilled gas under pressure is discharged through the passage in the valve to the interior of the segments of the filter, causing distention of the filter cloth as indicated at 192. This, assisted by the scraper 193, serves to remove the formed and dried filter cake. The reverse flow of chilled gas or blow-back terminates at 194, and a full block indicated at 195 separates the termination of the cake discharge zone from the beginning of the cake forming zone at 175; whereupon the cycle is repeated.

In dewaxing by pressure filtration, it has been customary to employ pressures of from about 40 to 60 pounds per square inch or higher. In applying the principles of pressure filtration to an enclosed vacuum filter, the obvious thing is to use a gas pressure within the filter casing of substantially this amount, in order to increase the pressure differential acting on the filtering surface, with a view to increasing filtering rates and capacity. I have found, however, that instead of being beneficial, such increased pressures may be actually harmful, due to the reduction in filtering rates. This is apparently due to the fact that the wax cake tends to compact under the increased pressure, thereby losing its pervious form of interwoven crystals, and becoming more or less of a slimy impervious mass. In accordance with the present invention, the chilled gaseous atmosphere within the filter casing is purposely maintained at such a pressure that a pressure differential on the filtering surface equivalent to not more than about 15 to 20 pounds per square inch is afforded. This is preferably accomplished by maintaining the gaseous atmosphere within the filter casing at substantially atmospheric pressure, or at only a few pounds above atmospheric pressure, the pressure differential being then secured by means of vacuum applied by the vacuum pump. This is effected in Figs. 2 and 3 by staging down the pressure of the gas being returned to the filter casing, as by the pressure reducing valves 56 and 148 respectively. This has the further advantage of minimizing gas leakage, thereby avoiding loss of associated solvent vapor.

Previous practice in connection with enclosed vacuum filters employing a pressure gas atmosphere therein, has been to either enclose the entire filter in a large casing forming in effect a filtering room, or to attempt to secure the cover of the filter casing to the vat or casing proper in gas tight relationship by bolting with the aid of sealing gaskets. The former practice is highly expensive; and the latter practice has the objection that frequent removal of the cover, which is necessary for adjustment, repair or replacement of parts, renders it difficult to maintain the proper sealing relationship when the cover is replaced.

Figure 5:
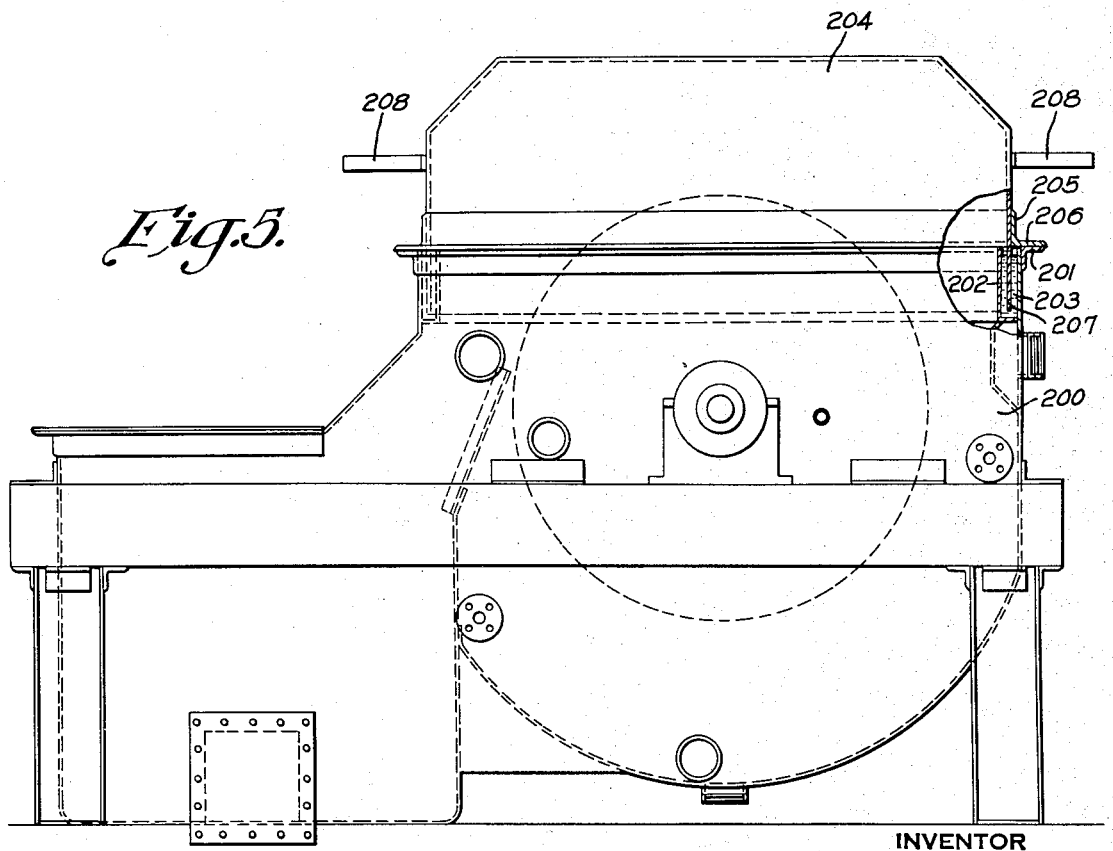
Fig. 5 is an elevational view of a continuous filter suitable for carrying out the present invention, certain parts being broken away and in section in order to illustrate the construction thereof.

The present invention overcomes these objections in the manner shown in Fig. 5, in which a commercial form of enclosed vacuum filter is shown in end elevation. The filter casing 200 is formed at its upper end with an outwardly extending flange 201. Entirely about the inner periphery of the upper portion of casing 200 is a narrow trough 202, to which is supplied a suitable sealing liquid 203. The removable cover 204 is formed with a surrounding reinforcing bar 205 carrying an outwardly extending flange 206 adapted to seat upon the flange 201 to support the cover. The latter carries a downwardly extending flange 207 about its periphery, which depends nearly to the bottom of the trough 202, and thus provides a liquid seal. Due to the fact that only a comparatively small gas pressure is maintained within the filter casing, a comparatively shallow trough 202 suffices to maintain the liquid seal. The cover is equipped with longitudinally extending handles 208 at opposite sides thereof, by which the cover may be attached to suitable chains or hooks of a conventional lifting mechanism or hoist, so that the cover may be easily and instantly removed and replaced.

Prior practice in the construction of rotary drum filters of the character disclosed herein, has been to fasten the filtering cloth over the filter by means of an exterior wire wrapping, generally in the form of a spirally wound wire. I have found that this may interfere with the satisfactory discharge of a wax cake. The scraper or deflector, which assists in removal of the cake, generally bears against or near this outer wire wrapping. Consequently, there is a substantial gap between the scraper and the filtering surface depending on the size of the wire used. Due to the peculiar nature of the wax cake, a portion of the wax tends to be retained about the wires on either side thereof, which eventually may slime or plug the filtering surface to a certain extent, reducing filtering rates. This is overcome in accordance with the present invention by the construction shown in Figs. 6 to 8 inclusive. Two of the longitudinal segments of a conventional filter are shown, the annular sealing blocks for the ends of the filter chambers of the segments being indicated at 210, and the division between two segments at 211. Individual filter cloths 212 are provided for each segment. Along the end surfaces of each segment, as indicated at 213, the filter cloth is caulked in place within a mortise and tenon type of groove 214 (Fig. 7) extending about the periphery of the blocks 210. The filter cloth is laid over the grooves, with a substantial extent overlapping the blocks 210; and then a cotton rope or other suitable cord is pounded into the groove as shown at 215, thereby forcing the filter cloth securely into the groove and locking it in place therein. The construction is such that the adjacent portions of the cloth at the upper end of the groove, indicated at 216, are substantially in contact with each other. Fig. 8 shows the manner in which the side edges of the individual filter cloths are fastened in place. 218 is a division strip which extends longitudinally of the filter, and is provided with a similar groove 219. Overlapping portions of two adjacent cloths 212 are secured within the groove by a longitudinally extending caulking rope 220. The outer surfaces of the cloths are thus free and fully exposed, giving full filtering area, and enabling the cloths to be more effectively distended by the blow-back gas, to thereby secure an efficient discharge of the cake.

The advantages of continuous filtration on rotary vacuum filters or analogous continuous filters as opposed to intermittent filtration on pressure filters or filter presses, has long been recognized in the filtration art generally. There have been scattered proposals to employ continuous rotary filters for dewaxing. The fact remains, however, that prior to the invention disclosed herein, the dewaxing art continued to employ the old intermittent pressure filters or filter presses. Successful dewaxing on continuous filters on a commercial scale was not achieved until features of the present invention were incorporated. The advantages of this method of continuous filtration over the heretofore used intermittent pressure filtration include such considerations as greatly increased plant capacity for a given amount of filter area, simplified plant operation, simplified means of applying a displacement wash to the filter cake so as to obtain higher yields, and considerable reduction in installation costs.

While there are a number of reasons why continuous filtration for wax separation has heretofore proved impractical in the industry, two of the outstanding reasons are no doubt—

First: The inability to maintain the filtering surface in highly effective filtering condition throughout a long period of continuous operation, and Second: The inability to continuously form a filter cake at commercially practical rates which could be satisfactorily removed from the continuously rotating filter.

The first reason for failure as noted above, has been overcome by a combination of features of the present invention, including the chilled gas recirculation system which maintains the filtering surface at all times at a temperature approximating that of the chilled wax-bearing mixture being filtered, such as to prevent re-solution of the wax with plugging of the filter cloth; the use of wax-bearing mixtures resulting from solvent dewaxing of such character that the precipitated wax is in a better form for filtration; the employment for washing of the cake of a selective solvent mixture of such character that the wax is substantially completely insoluble therein at the temperature of treatment; and the use of filtration pressures or pressure differentials, together with a reduced filtering time per cycle to which the wax cake is subjected to such pressure differential, such that compacting of the cake down into the pores of the filter cloth is avoided.

In explanation of the second reason for failure noted above, comparison is herein made with the customary practice of dewaxing on intermittent pressure filters. A typical filtering cycle on the latter is the following:

The period of filtration, in which the filter press or pressure filter is filled with the chilled wax-bearing mixture under pressure, and the oil forced through the filter cloths while the wax builds up in a cake on the exterior thereof, generally consuming about 20 to 30 minutes; the period of blow-back, in which the wax-bearing mixture remaining in the filter at the termination of the filtering operation is blown back to the supply tanks, generally consuming about 3 to 5 minutes; the period of washing, in which the filter is filled with wash solvent under pressure to wash retained oil out of the cake, generally consuming about 15 to 20 minutes; the period of drying, in which gas pressure is applied to the filter cake to remove retained solvent, generally consuming about 10 minutes; and the period of removing the wax cake from the filter, generally consuming about 10 minutes. It is thus apparent that the overall filtering cycle consumes approximately 50 to 65 minutes, in which less than 50% of that time is employed in actual wax filtration.

Applying the above periods of time to a continuous filtration cycle necessitates that the filter rotate at an extremely low rate of speed, given difficulties in the drive and reduction gearing therefor. In attempting to speed up the continuous filter by reducing the time for the various operations carried out in the cycle, difficulty was experienced in the building up of a cake of sufficient thickness to enable satisfactory continuous removal. In general, it may be stated that a cake of not substantially less than ¼" in thickness should be formed for satisfactory removal. However, where the cake is compacted during the cycle, a still thicker cake appears necessary for securing satisfactory removal. The use of filter aid has assisted in this problem. In accordance with the present invention, this objection has been satisfactorily overcome, and a cake forming time of as short as from about 1 to 4 minutes or even less has been made practicable. This is accomplished by the use of a wax crystal modifying material of such character that crystal formation is modified upon chilling the wax-bearing oil in the presence of such material, coupled with other features of the present invention including the comparatively low pressure differential which avoids compacting of the cake. By the use of wax crystal modifying materials of this character, filtration rates of the oil may be increased as much as 100% or more. This is of peculiar cooperation with continuous filtration, because it enables a cake of satisfactory thickness to be built up while employing a commercially practical rate of rotation of the filter, such as to give a cake forming time of not more than 4 minutes per cycle. In addition, it is pointed out that a 100% increase in filtration rate on a continuous filter results in a 100% increase in capacity of the plant; whereas, a similar increase in filtration rate in an intermittent filtration process gives only a fraction of such increase in plant capacity, due to the fact that the actual filtering time is only a fraction of the complete operating time in the cycle.

Various wax crystal modifying materials may be employed for this purpose, such for example, as a cracked pitchy residue resulting from the re-cracking of a cracked cycle fuel, as set forth in co-pending application Serial No. 686,244, filed August 22, 1933; the high vacuum distillation residue of a condensation product of naphthalene in the presence of aluminum chloride, as described in co-pending application Serial No. 716,564, filed March 21, 1934. Also, other types of wax crystal modifying materials, such as a condensation product of a chlorinated wax with an aromatic hydrocarbon in the presence of aluminum chloride, certain mineral oil distillation residues, coal tar residues, etc., may be used for this purpose. As the methods of forming such materials and of using them as wax crystal modifying materials generally, form no part of the present invention, apart from their particular adaptation to continuous filtration, no further description thereof is thought needed. However, it may be stated that such materials are generally added in a proportion of from about 0.3% to 6% by weight on the weight of the wax-bearing oil and are dissolved in the oil, the oil is then chilled in the presence of the materials, and wax is precipitated in a resulting form which increases filtration rates.

In accordance with the present invention, there is coupled with the increased filtration rates attributable to solvent dewaxing with the solvent mixtures specified above, and the use of wax crystal modifying materials, a coordinated control of the pick-up or cake forming time so as to employ only the highest or peak portion of the filtration rates during continuous filtration. In explanation, it is pointed out that the actual rate of flow of a filtrate for a given length of filtering time at a constant effective pressure differential is about the same for both a pressure filter and a vacuum filter. The highest rate of flow is at the beginning of the filtering period, and this rapidly decreases as the thickness of the deposit of solids increases beyond a certain value. In an intermittent pressure filter, for example, substantially 70% to 80% of the filtrate may pass through the filter in the first 2 to 4 minutes of the filtering time. Continued application of the pressure upon the cake thus built up compacts this cake, so that the filtering rate then drops off rapidly. However, due to the length of time consumed in the other treatments of washing, drying, dumping of the cake, etc., in the intermittent filtration cycle, it is commercially impractical to terminate the filtration period until a cake approaching about 1" in thickness has been built up, which as set forth above normally requires from about 20 to 30 minutes. On the other hand, the cake forming time of the present method of continuous filtration is limited to only that initial part of the filtration period of the intermittent filter, in which substantially the highest filtering rates occur. This further improves the overall efficiency of the continuous filtration, giving a materially increased plant capacity. For example, the cake forming time is coordinated with the filtration rate so that only the high filtration rates normally obtained with an uncompacted cake of a thickness less than ½" are utilized, such a cake forming time being generally not more than 4 minutes in extent, and often as little as 1 minute or less. Nevertheless, with such a short period of cake formation, the high filtration rates enable a wax cake of a thickness in excess of ¼" to be formed; and often a cake of about ⅜" to ½" or more in thickness results. This is readily removed in continuous operation.

The successive steps of the filtering cycle are also performed in proportionately short intervals of time. In connection with the washing time, it is found that the yields of dewaxed oil increase with an increase in ratio of washing time to pick-up time. Ordinarily, a washing time which is not less than one-third the pick-up time is employed, which means that the peripheral extent of the washing zone is at least one-third the peripheral extent of the pick-up or cake forming zone; and the highest yields appear to be obtained when the washing time is increased so as to be substantially equal to the pick-up time. However, the actual differences in yields of dewaxed oil for variation in the washing time from one-third the pick-up time to a time equal to the pick-up time, are comparatively small, so that operations within this range are satisfactory. The resulting average or cycle rate of flow of the continuous filter operating in accordance with the present invention is thus much higher than that commonly obtained on an intermittent filter. By way of example, a filtration rate of about 0.4 to 0.6 gallons of wax-free oil per hour per square foot of filtering surface is considered a very satisfactory rate for an intermittent pressure filter. By operating in accordance with the present invention, a filtration rate of from 2.0 to as high as 3.5 gallons per hour per square foot of filtering surface has been obtained, thus giving a plant capacity of about four or more times that of the intermittent filter.

At the same time, the dewaxed oil yield is increased, due to the superior washing and drying of the cake. For example, a dewaxed oil yield of about 80% to 85% has been regularly obtained in practice, as compared to a dewaxed oil yield of around 75% or lower on the intermittent pressure filter.

The following are examples of results obtained in the dewaxing of oil by continuous filtration without the employment of filter aid in accordance with the present invention:

A Mid-Continent distillate oil and an Illinois-Kentucky distillate oil were employed, these oils having the following tests:

|  | Mid-Continent | Illinois-Kentucky |
|---|---|---|
| Gravity, °A. P. I. | 23.7 | 23.1 |
| Flash, °F | 450 | 460 |
| Fire, °F | 550 | 550 |
| Vis. @ 210 °F | 71 | 69 |
| Pour test, °F | 105 | 90 |

A selective solvent mixture composed of acetone 35%, benzol 52% and toluol 13% was employed in the ratio of 4 parts of solvent to 1 part of charge stock. The oil was then chilled to a temperature of about −10° F. or slightly lower, and the chilled wax-bearing mixture passed to the continuous filter. The following tabulation indicates the operations and results obtained:

|  | Mid-Cont. run #1 | Mid-Cont. run #2 | Ill.-Ky. run #1 | Ill.-Ky. run #2 |
|---|---|---|---|---|
| Filtering temperature, °F.: |  |  |  |  |
| Wax dist. mix | −9 | −13 | −13 | −14 |
| Wash solvent | −4 | −10 | −12 | −12 |
| Time of filtration in secs.: |  |  |  |  |
| Pick-up stage | 120 | 120 | 120 | 60 |
| Drying stage | 40 | 30 | 10 | 10 |
| Washing stage | 40 | 60 | 60 | 60 |
| Drying stage | 40 | 30 | 50 | 50 |
| Cake discharge stage | 48 | 48 | 48 | 35 |
| Total cycle time in minutes | 4.8 | 4.8 | 4.8 | 3.6 |
| Cycles per hour | 12.6 | 12.6 | 12.6 | 16.8 |
| Cake thickness in inches |  | ½-¾ | ½-¾ | ¾ |
| Filtering rate of dewaxed oil in gal./sq. ft./hr | 2.6 | 2.5 | 2.7 | 3.0 |
| Yields percent by weight: |  |  |  |  |
| Dewaxed oil | 80.3 | 82.9 | 82.3 | 85.6 |
| Slack wax | 19.7 | 17.1 | 17.7 | 14.4 |
| Solid point °F. of dewaxed oil | −8 | −12 | −10 | −8 |
| Dewaxing differential °F | 1 | 1 | 3 | 6 |

While the invention has been described in connection with the separation of wax from wax-bearing oils, it is to be understood that it is also applicable to the removal of similar types of solid materials from liquids wherein it is desirable to maintain the resulting cake of solids at a temperature below that at which the solids tend to liquefy and reach a condition where they penetrate the fabric and ultimately result in plugging.

Obviously many modifications and variations of the invention, as hereinbefore set forth, may be made without departing from the spirit and scope thereof, and therefore only such limitations should be imposed as are indicated in the appended claims.

I claim:

1. In the continuous process of dewaxing mineral oil by continuously filtering the chilled wax-bearing mixture at temperatures of around 0° F. or lower, and wherein a wax filter cake is continuously formed on a moveable filtering surface which consecutively submerges within the chilled mixture to deposit a filter cake thereon, and then emerges from the chilled mixture after which the said cake on the emerged filtering surface is continuously washed, dried and discharged therefrom; the steps which comprise supplying a chilled gaseous atmosphere to surround exposed portions of the filtering surface after emergence from the chilled mixture and to maintain a pressure slightly in excess of atmospheric pressure upon the wax cake during the washing and drying operations, the gaseous atmosphere having a temperature approximating that of the chilled wax-bearing mixture being filtered, supplying a chilled solvent mixture in which the wax is substantially insoluble for the washing operation and applying the said solvent mixture to the wax cake on the filtering surface by flowing the solvent mixture by gravity onto the wax cake to form a continuous liquid film on the said cake, and regulating the pressure differential on the filtering surface during the washing and drying operations so as to maintain said pressure differential at less than twenty pounds per square inch to avoid compacting of the wax cake.

2. The method of continuously separating wax from a wax slurry on a rotary filter element mounted within a filter casing having an enclosing cover, which comprises immersing said element in a wax slurry under a pressure differential sufficient to force filtrate through the element and to build up a wax cake thereon, removing the filter cake from the slurry, washing said filter cake, drying said cake by means of a stripping gas, continuously removing said cake from said element, introducing a stripping medium into said casing to provide a chilled gaseous atmosphere therein between said filter casing with enclosing cover and said filter element, which gaseous atmosphere is at a temperature approximating that of the wax slurry being filtered and supplies said stripping gas, and regulating the pressure of the said gaseous atmosphere and the pressure differential through said filter element to maintain a pressure differential through said filter element which is less than 20#/sq. in. to avoid objectionable compression of the said wax cake on the filter element.

3. The method of continuously separating wax from a wax slurry on a rotary filter element mounted within a filter casing having an enclosing cover, which comprises immersing said element in a wax slurry under a pressure differential sufficient to force filtrate through the element and to build up a wax cake thereon, removing the filter cake from the slurry, washing said filter cake, drying said cake by means of a stripping gas, continuously removing said cake from said element, introducing a stripping medium into said casing to provide a chilled gaseous atmosphere therein between said filter casing with enclosing cover and said filter element, which gaseous atmosphere is at a temperature approximating that of the wax slurry being filtered and supplies said stripping gas, and regulating the pressure of the said gaseous atmosphere and the pressure differential through said filter element to maintain a pressure differential through said filter element which is less than 15#/sq. in to avoid objectionable compression of the said wax cake on the filter element.

4. The method of continuously separating wax from a wax slurry on a rotary filter element mounted within a filter casing having enclosing cover, which comprises immersing the said element in a wax slurry under a pressure differential sufficient to force filtrate through the element and to build up a wax cake thereon, removing the filter cake from the slurry, washing said filter cake with dewaxing solvent chilled to a temperature approximating that of the wax slurry being filtered by preforming the solvent as a continuous liquid film and leading this continuous film onto the cake, drying said cake by means of a stripping gas, continuously removing said cake from said element, introducing a stripping medium into said casing to provide a chilled gaseous atmosphere therein between said filter casing with enclosing cover and said filter element, which gaseous atmosphere is at a temperature approximating that of the wax slurry being filtered and supplies said stripping gas, and regulating the pressure of the said gaseous atmosphere and the pressure differential through said filter element to maintain a pressure differential through said filter element which is less than fifteen pounds per square inch to avoid objectionable compression of the said wax cake on the filter element.

WILLIAM P. GEE.